United States Patent
Tamura et al.

(10) Patent No.: US 11,827,246 B2
(45) Date of Patent: Nov. 28, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Sho Tamura, Wako (JP); Takao Tamura, Wako (JP); Daichi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 17/673,893

(22) Filed: Feb. 17, 2022

(65) Prior Publication Data

US 2022/0315043 A1  Oct. 6, 2022

(30) Foreign Application Priority Data

Mar. 31, 2021 (JP) .................................. 2021-060310

(51) Int. Cl.
*B60W 60/00* (2020.01)
*G06V 20/56* (2022.01)

(52) U.S. Cl.
CPC ....... *B60W 60/005* (2020.02); *B60W 2420/42* (2013.01); *B60W 2420/52* (2013.01);
(Continued)

(58) Field of Classification Search
CPC .............. B60W 60/00; B60W 60/005; B60W 2540/18; B60W 2552/53; B60W 2556/40; G06V 10/98; G06V 20/588
See application file for complete search history.

(56) References Cited

U.S. PATENT DOCUMENTS

2019/0258249 A1\* 8/2019 Kim ................... G01C 21/3837
2020/0400439 A1\* 12/2020 Thompson ......... G01C 21/3697
(Continued)

FOREIGN PATENT DOCUMENTS

| JP | 2017-146724 | 8/2017 |
| JP | 2018-045500 | 3/2018 |

(Continued)

OTHER PUBLICATIONS

Japanese Notice of Allowance for Japanese Patent Application No. 2021-060310 dated Nov. 29, 2022.

*Primary Examiner* — John Kwon
(74) *Attorney, Agent, or Firm* — AMIN, TUROCY & WATSON, LLP (57) ABSTRACT

A vehicle control device recognizes a surrounding situation of a vehicle, controls steering and acceleration or deceleration of the vehicle without depending on an operation of a driver of the vehicle based on the surrounding situation and map information, determines a driving mode of the vehicle to be one of a plurality of driving modes including a first driving mode and a second driving mode, determines whether there is an error in the map information based on the surrounding situation and the map information, and in a case where an error is determined in the map information while the vehicle is driving in the second driving mode, continues the second driving mode when a preceding vehicle is recognized within a first predetermined distance, or changes the second driving mode to the first driving mode when a preceding vehicle is not recognized within the first predetermined distance.

15 Claims, 7 Drawing Sheets

(52) U.S. Cl.
CPC ..... *B60W 2540/18* (2013.01); *B60W 2552/53* (2020.02); *B60W 2554/802* (2020.02); *B60W 2556/40* (2020.02); *B60W 2710/20* (2013.01); *B60W 2720/106* (2013.01); *G06V 20/588* (2022.01)

(56) References Cited

U.S. PATENT DOCUMENTS

| | | | | |
|---|---|---|---|---|
| 2021/0149415 | A1* | 5/2021 | Bush | G01C 21/30 |
| 2021/0199462 | A1* | 7/2021 | Namba | G08G 1/096783 |
| 2021/0284148 | A1* | 9/2021 | Kato | B60W 30/182 |
| 2022/0315044 | A1* | 10/2022 | Tamura | B60W 60/005 |
| 2022/0315058 | A1* | 10/2022 | Tamura | B60W 60/0053 |

FOREIGN PATENT DOCUMENTS

| | | |
|---|---|---|
| JP | 2018-189900 | 11/2018 |
| JP | 2019-038396 | 3/2019 |
| JP | 2020-050086 | 4/2020 |

* cited by examiner

| DRIVING MODE | CONTROL STATE | TASK |
|---|---|---|
| MODE A | AUTOMATED DRIVING | FORWARD MONITORING: NOT REQUIRED<br>STEERING GRIPPING: NOT REQUIRED |
| MODE B | DRIVING SUPPORT | FORWARD MONITORING: REQUIRED<br>STEERING GRIPPING: NOT REQUIRED |
| MODE C | DRIVING SUPPORT | FORWARD MONITORING: REQUIRED<br>STEERING GRIPPING: REQUIRED |
| MODE D | DRIVING SUPPORT | FORWARD MONITORING: REQUIRED<br>AT LEAST CERTAIN DEGREE OF DRIVING OPERATION IS REQUIRED |
| MODE E | MANUAL DRIVING | FORWARD MONITORING: REQUIRED<br>DRIVING OPERATION IS REQUIRED FOR BOTH STEERING AND ACCELERATION OR DECELERATION |

↑ TASK: MILD

↓ TASK: HEAVY

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2021-060310, filed Mar. 31, 2021, the content of which is incorporated herein by reference.

BACKGROUND

Field of the Invention

The present invention relates to a vehicle control device, a vehicle control method, and a storage medium.

Description of Related Art

A technology for changing a mode of driving control of a vehicle is known. For example, Japanese Unexamined Patent Application, First Publication No. 2020-050086, discloses a technology of changing driving control based on lane markings to driving control in another mode when the lane markings of a road are continuously difficult to recognize.

SUMMARY

However, with the conventional technology, when map information mounted in a vehicle and recognized external world information are different from each other, it may not be possible to flexibly change the driving control.

The present invention has been made in consideration of such circumstances, and an object thereof is to provide a vehicle control device, a vehicle control method, and a storage medium that can flexibly change driving control even when map information mounted in a vehicle and recognized external world information are different from each other.

A vehicle control device, a vehicle control method, and a storage medium according to the present invention have adopted the following configuration.

(1): A vehicle control device according to one aspect of the present invention includes a storage device which stores a program, and a hardware processor, in which the hardware processor executes the program stored in the storage device, thereby recognizing a surrounding situation of a vehicle; controlling steering and acceleration or deceleration of the vehicle without depending on an operation of a driver of the vehicle on the basis of the surrounding situation and map information; determining a driving mode of the vehicle to be one of a plurality of driving modes including a first driving mode and a second driving mode, and changing the driving mode of the vehicle to a driving mode in which a task is heavier when a task related to the determined driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of the driver of the vehicle; determining whether there is an error in the map information on the basis of the surrounding situation and the map information; and in a case where it is determined that there is an error in the map information while the vehicle is driving in the second driving mode, continuing the second driving mode when a preceding vehicle is recognized within a first predetermined distance on a traveling direction side of the vehicle, or changing the second driving mode to the first driving mode when a preceding vehicle is not recognized within the first predetermined distance on the traveling direction side of the vehicle.

(2): In the aspect of (1) described above, the hardware processor compares road lane marking information of the map information with a recognized road lane marking and, when the road lane marking information does not match the road lane marking, determines whether there is an error in the map information on the basis of whether road lane markings on both sides of the vehicle are recognizable and a degree of parallelization of the road lane markings on both sides.

(3): In the aspect of (2) described above, the hardware processor determines whether there is an error in the map information further on the basis of a traveling trajectory of the preceding vehicle when the road lane marking information of the map information does not match the recognized road lane marking.

(4): In the aspect of (1) described above, the hardware processor causes the vehicle to follow the preceding vehicle on the basis of a traveling trajectory of the preceding vehicle when the second driving mode is continued.

(5): In the aspect of (4) described above, the second driving mode is executed in a predetermined speed range, the hardware processor sets an inter-vehicle time between the vehicle and the preceding vehicle to a first predetermined time when the vehicle is caused to follow the preceding vehicle, and the first predetermined time is a time during which both a road lane marking and a traveling trajectory of the preceding vehicle are recognizable.

(6): In the aspect of (5) described above, the vehicle control device further includes a grip sensor configured to detect whether a driver of the vehicle is gripping an operator that receives a steering operation of the vehicle, in which the hardware processor changes the first predetermined time to a smaller value when the grip sensor has detected that the driver is gripping the steering wheel.

(7): In the aspect of (5) described above, the hardware processor changes the second driving mode to the first driving mode when an inter-vehicle time between the vehicle and the preceding vehicle is equal to or longer than a second predetermined time which is longer than the first predetermined time.

(8): In the aspect of (4) described above, the hardware processor sets an inter-vehicle distance between the vehicle and the preceding vehicle to a second predetermined distance when the vehicle follows the preceding vehicle, and the second predetermined distance is a distance at which both a road lane marking and a traveling trajectory of the preceding vehicle are recognizable.

(9): In the aspect of (8) described above, the vehicle control device further includes a grip sensor configured to detect whether a driver of the vehicle is gripping an operator that receives a steering operation of the vehicle, in which the hardware processor changes the second predetermined distance to a smaller value when the grip sensor has detected that the driver is gripping the steering wheel.

(10): In the aspect of (1) described above, the hardware processor changes the second driving mode to the first driving mode after continuing the second driving mode for a certain period when the hardware processor does not recognize a preceding vehicle within the first predetermined distance with respect to a front of the vehicle in a traveling direction.

(11): In the aspect of (1) described above, the hardware processor changes the second driving mode to the first driving mode when only one side of a road lane marking is recognized.

(12): In the aspect of (1) described above, the hardware processor changes the second driving mode to the first driving mode when a deviation between a recognized road lane marking and the map information is equal to or greater than a threshold value.

(13): In the aspect of (1) described above, the second driving mode is a driving mode in which a task of gripping an operator that receives a steering operation of the vehicle is not imposed on the driver, and the first driving mode is a driving mode in which at least a task of gripping the operator that receives a steering operation of the driver is imposed on the driver.

(14): A vehicle control method according to another aspect of the present invention is a vehicle control method to be executed by a computer, including: recognizing a surrounding situation of a vehicle; controlling steering and acceleration or deceleration of the vehicle without depending on an operation of a driver of the vehicle on the basis of the surrounding situation and map information; determining a driving mode of the vehicle to be one of a plurality of driving modes including a first driving mode and a second driving mode, and changing the driving mode of the vehicle to a driving mode in which a task is heavier when a task related to the determined driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of the driver of the vehicle; determining whether there is an error in the map information on the basis of the surrounding situation and the map information; and when it is determined that there is an error in the map information while the vehicle is driving in the second driving mode, continuing the second driving mode when a preceding vehicle is recognized within a first predetermined distance on a traveling direction side of the vehicle, or changing the second driving mode to the first driving mode when a preceding vehicle is not recognized within the first predetermined distance on the traveling direction side of the vehicle.

(15): A computer-readable non-transitory storage medium according to still another aspect of the present invention stores a program causing a computer to execute recognizing a surrounding situation of a vehicle; controlling steering and acceleration or deceleration of the vehicle without depending on an operation of a driver of the vehicle on the basis of the surrounding situation and map information; determining a driving mode of the vehicle to be one of a plurality of driving modes including a first driving mode and a second driving mode, and changing the driving mode of the vehicle to a driving mode in which a task is heavier when a task related to the determined driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of the driver of the vehicle; determining whether there is an error in the map information on the basis of the surrounding situation and the map information; and when it is determined that there is an error in the map information while the vehicle is driving in the second driving mode, continuing the second driving mode when a preceding vehicle is recognized within a first predetermined distance on a traveling direction side of the vehicle, or changing the second driving mode to the first driving mode when a preceding vehicle is not recognized within the first predetermined distance on the traveling direction side of the vehicle.

According to (1) to (15), even if the map information mounted in the vehicle and the recognized external world information are different from each other, it is possible to flexibly change the driving control.

DESCRIPTION OF EMBODIMENTS

Hereinafter, embodiments of a vehicle control device, a vehicle control method, and a program of the present invention will be described with reference to the drawings.

Overall Configuration

Figure 1:
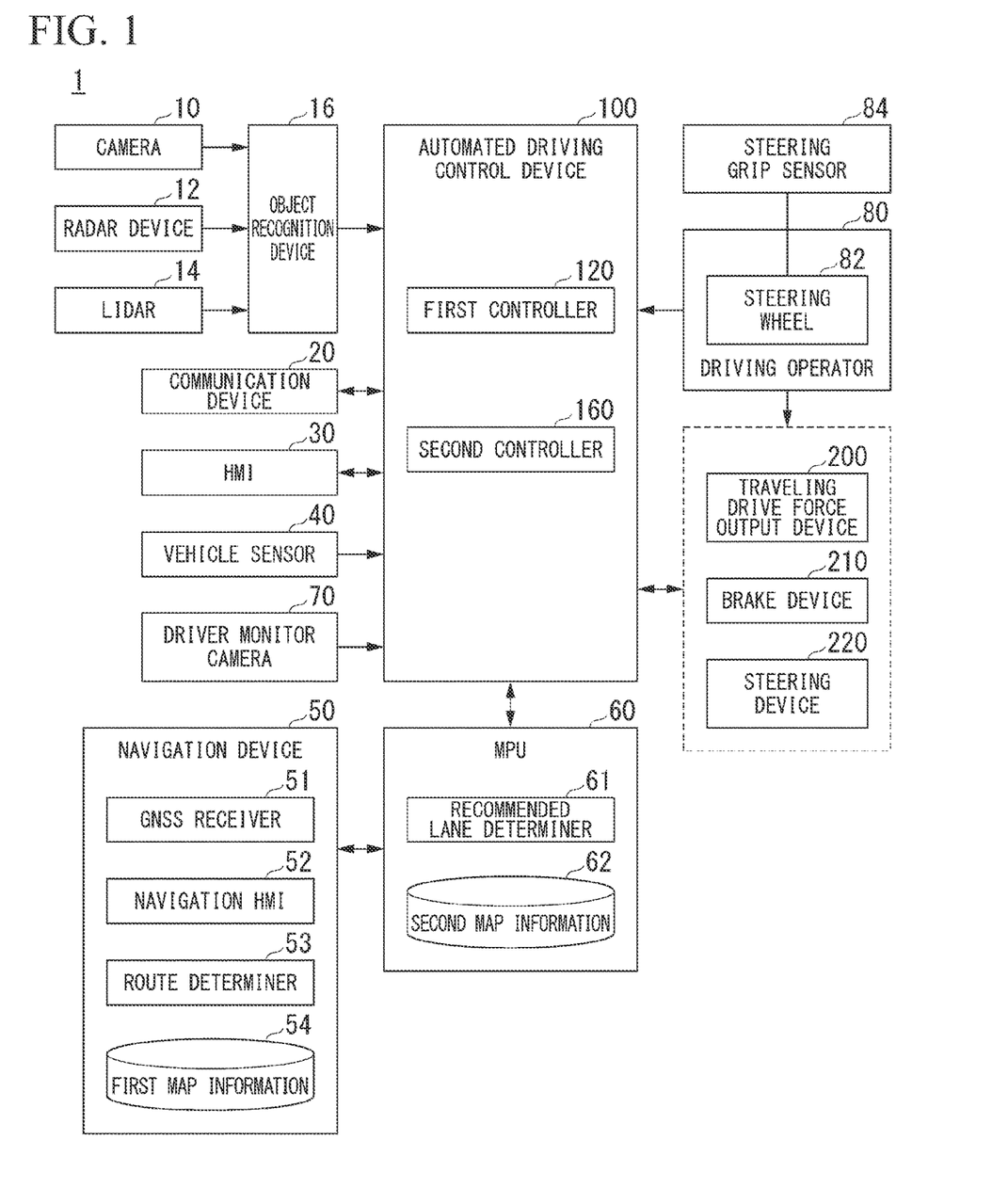
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells.

The vehicle system 1 includes, for example, a camera 10, a radar device 12, a light detection and ranging (LIDAR) 14, an object recognition device 16, a communication device 20, a human machine interface (HMI) 30, and a vehicle sensor 40, a navigation device 50, a map positioning unit (MPU) 60, a driver monitor camera 70, a driving operator 80, an automated driving control device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added.

The camera 10 is a digital camera that uses a solid-state image sensor such as a charge coupled device (CCD) or a complementary metal oxide semiconductor (CMOS). The camera 10 is attached to an arbitrary place in a vehicle in which the vehicle system 1 is mounted (hereinafter, referred to as a host vehicle M). When an image of the front is captured, the camera 10 is attached to an upper part of the front windshield, a back surface of the windshield rear-view mirror, and the like. The camera 10 periodically and repeatedly captures, for example, an image of a periphery of the host vehicle M. The camera 10 may be a stereo camera.

The radar device 12 radiates radio waves such as millimeter waves to the periphery of the host vehicle M, and also detects at least a position (a distance and an orientation) of an object by detecting radio waves (reflected waves) reflected by the object. The radar device 12 is attached to an arbitrary place on the host vehicle M. The radar device 12 may detect the position and speed of an object in a frequency modulated continuous wave (FM-CW) method.

The LIDAR 14 irradiates the periphery of the host vehicle M with light (or electromagnetic waves with wavelengths close to light) and measures scattered light. The LIDAR 14 detects a distance to a target based on a time from light emission to light reception. The radiated light is, for example, a pulsed laser beam. The LIDAR 14 is attached to an arbitrary place on the host vehicle M.

The object recognition device 16 performs sensor fusion processing on a result of detection by a part or all of the camera 10, the radar device 12, and the LIDAR 14, and recognizes the position, type, speed, and the like of an object. The object recognition device 16 outputs a result of recognition to the automated driving control device 100. The object recognition device 16 may output the results of detection by the camera 10, the radar device 12, and the LIDAR 14 to the automated driving control device 100 as they are. The object recognition device 16 may be omitted from the vehicle system 1.

The communication device 20 communicates with other vehicles present in the periphery of the host vehicle M by using, for example, a cellular network, a Wi-Fi network, Bluetooth (a registered trademark), dedicated short range communication (DSRC), or the like, or communicates with various server devices via a wireless base station.

The HMI 30 presents various types of information to an occupant of the host vehicle M and receives an input operation by the occupant. The HMI 30 includes various display devices, a speaker, a buzzer, a touch panel, a switch, a key and the like.

The vehicle sensor 40 includes a vehicle speed sensor that detects a speed of the host vehicle M, an acceleration sensor that detects acceleration, a yaw rate sensor that detects an angular speed around a vertical axis, an azimuth sensor that detects a direction of the host vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M based on a signal received from a GNSS satellite. The position of the host vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route from the position of the host vehicle M (or an arbitrary position to be input) identified by the GNSS receiver 51 to a destination to be input by the occupant using the navigation HMI 52 (hereinafter, a route on a map) with reference to the first map information 54. The first map information 54 is, for example, information in which a road shape is expressed by a link indicating a road and nodes connected by a link. The first map information 54 may include a road curvature, point of interest (POI) information, and the like.

A route on a map is output to the MPU 60. The navigation device 50 may perform route guidance using the navigation HMI 52 based on the route on a map. The navigation device 50 may be realized by, for example, a function of a terminal device such as a smartphone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. The recommended lane determiner 61 determines which lane from the left to drive.

When a branch place is present on the route on a map, the recommended lane determiner 61 determines a recommended lane so that the host vehicle M can travel on a reasonable route to proceed to the branch destination.

The second map information 62 is map information with higher accuracy than the first map information 54. The second map information 62 includes, for example, information on a center of a lane, information on a boundary of the lane, and the like. The second map information 62 may include road information, traffic regulation information, address information (addresses/zip codes), facility information, telephone number information, information on a prohibited section where a mode A or a mode B to be described below will be prohibited, and the like. The second map information 62 may be updated at any time by the communication device 20 communicating with another device.

The driver monitor camera 70 is, for example, a digital camera using a solid-state image sensor such as a CCD or CMOS. The driver monitor camera 70 is attached to an arbitrary place of the host vehicle M at a position and in a direction in which a head of an occupant (hereinafter referred to as a driver) seated in a driver seat of the host vehicle M can be imaged from the front (in a direction in which the face is imaged). For example, the driver monitor camera 70 is attached to an upper part of a display device provided in a center of an instrument panel of the host vehicle M.

The driving operator 80 includes, for example, in addition to the steering wheel 82, an accelerator pedal, a brake pedal, a shift lever, and other operators. The driving operator 80 is attached to a sensor that detects the amount of operation or a presence or absence of an operation, and a result of detection is output to the automated driving control device 100, or some or all of the traveling drive force output device 200, the brake device 210, and the steering device 220. The steering wheel 82 is an example of an "operator that receives a steering operation." The operator does not necessarily have to be annular, and may be in a form of a deformed steering hole, a joystick, a button, or the like. A steering grip sensor 84 is attached to the steering wheel 82. The steering grip sensor 84 is realized by a capacitance sensor or the like, and outputs a signal that can detect whether a driver is gripping the steering wheel 82 (referring to the driver is in contact with the steering wheel 82 with power added thereto) to the automated driving control device 100.

The automated driving control device 100 includes, for example, a first controller 120 and a second controller 160. The first controller 120 and the second controller 160 are realized by, for example, a hardware processor such as a central processing unit (CPU) executing a program (software), respectively. In addition, some or all of these components may be realized by hardware (a circuit unit; including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the automated driving control device 100, or may be stored in a detachable storage medium such as a DVD or a CD-ROM and installed in the HDD or flash memory of the automated driving control device 100 by the storage medium (non-transitory storage medium) being attached to a drive device. The automated driving control device 100 is an example of the "vehicle control device," and a combination of the action plan generator 140 and the second controller 160 is an example of a "driving controller."

Figure 2:
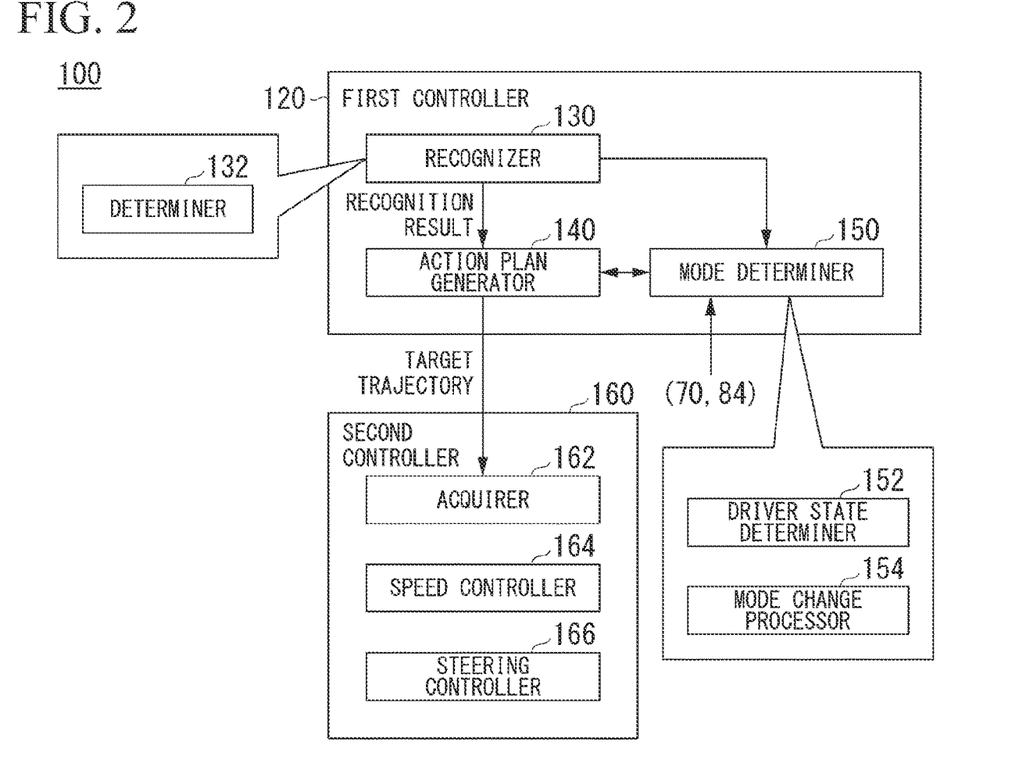
FIG. 2 is a functional configuration diagram of a first controller and a second controller.

FIG. 2 is a functional configuration diagram of the first controller 120 and the second controller 160. The first controller 120 includes, for example, a recognizer 130, an action plan generator 140, and the mode determiner 150. The first controller 120 realizes, for example, a function by artificial intelligence (AI) and a function of a predetermined model in parallel. For example, a function of "recognizing an intersection" may be realized by executing both recognition of an intersection by deep learning and recognition based on a predetermined condition (a signal for enabling pattern matching, a road sign, or the like) in parallel, and scoring and comprehensively evaluating the both. As a result, reliability of automated driving is ensured.

The recognizer 130 recognizes the position of an object in the periphery of the host vehicle M and states such as a speed and acceleration thereof based on information input from the camera 10, the radar device 12, and the LIDAR 14 via the object recognition device 16. The position of an object is recognized as, for example, a position on absolute coordinates with a representative point (a center of gravity, a center of a drive axis, or the like) of the host vehicle M as an origin, and is used for control. The position of an object may be represented by a representative point such as the center of gravity or a corner of the object, or may be represented by an area. The "states" of an object may include the acceleration or jerk of the object, or a "behavioral state" (for example, whether a lane is being changed or is about to be changed).

In addition, the recognizer 130 recognizes, for example, a lane (a traveling lane) in which the host vehicle M is traveling. For example, the recognizer 130 recognizes a traveling lane by comparing a pattern of road lane marking (for example, an array of solid lines and broken lines) obtained from the second map information 62 with a pattern of road lane marking in the periphery of the host vehicle M recognized from an image captured by the camera 10. The recognizer 130 may also recognize a traveling lane by recognizing not only the road lane marking but also track boundaries (road boundaries) including the road lane marking, a road shoulder, a curb, a median strip, a guardrail, and the like. In this recognition, the position of the host vehicle M acquired from the navigation device 50 and a result of processing by the INS may be taken into consideration. Moreover, the recognizer 130 recognizes stop lines, obstacles, red lights, tollhouses, and other road events.

The recognizer 130 recognizes the position and posture of the host vehicle M with respect to a traveling lane when a traveling lane is recognized. The recognizer 130 may recognize, for example, a deviation of a reference point of the host vehicle M from a center of the lane and an angle of the host vehicle M, formed with respect to a line connecting the centers of the lane in the traveling direction, as a relative position and the posture of the host vehicle M with respect to the traveling lane. Instead, the recognizer 130 may recognize the position or the like of the reference point of the host vehicle M with respect to any side end (a road lane marking or road boundary) of the traveling lane as the relative position of the host vehicle M with respect to the traveling lane. The recognizer 130 further includes the determiner 132, but details of the determiner 132 will be described below.

The action plan generator 140 generates a target trajectory on which the host vehicle M automatically (regardless of an operation of a driver) in the future such that the host vehicle M travels in a recommended lane determined by the recommended lane determiner 61 in principle, and is able to respond to surrounding conditions of the host vehicle M. The target trajectory includes, for example, a speed element. For example, the target trajectory is expressed as points (trajectory points) to be reached by the host vehicle M, arranged in order. The trajectory point is a point to be reached by the host vehicle M for each predetermined traveling distance (for example, about several [m]) along a road, and, separately, a target speed and a target acceleration for each predetermined sampling time (for example, about decimal point number [sec]) are generated as a part of the target trajectory. In addition, the trajectory point may be a position to be reached by the host vehicle M at a corresponding sampling time for each predetermined sampling time. In this case, information on the target speed and target acceleration is expressed by an interval between trajectory points.

The action plan generator 140 may set an event of automated driving when a target trajectory is generated. The event of automated driving includes a constant-speed traveling event, a low-speed following traveling event, a lane change event, a branching event, a merging event, and a takeover event. The action plan generator 140 generates a target trajectory according to an event to be started.

The mode determiner 150 determines a driving mode of the host vehicle M to be one of a plurality of driving modes in which tasks imposed on a driver are different. The mode determiner 150 includes, for example, a driver state determiner 152 and a mode change processor 154. Individual functions of these will be described below.

Figure 3:
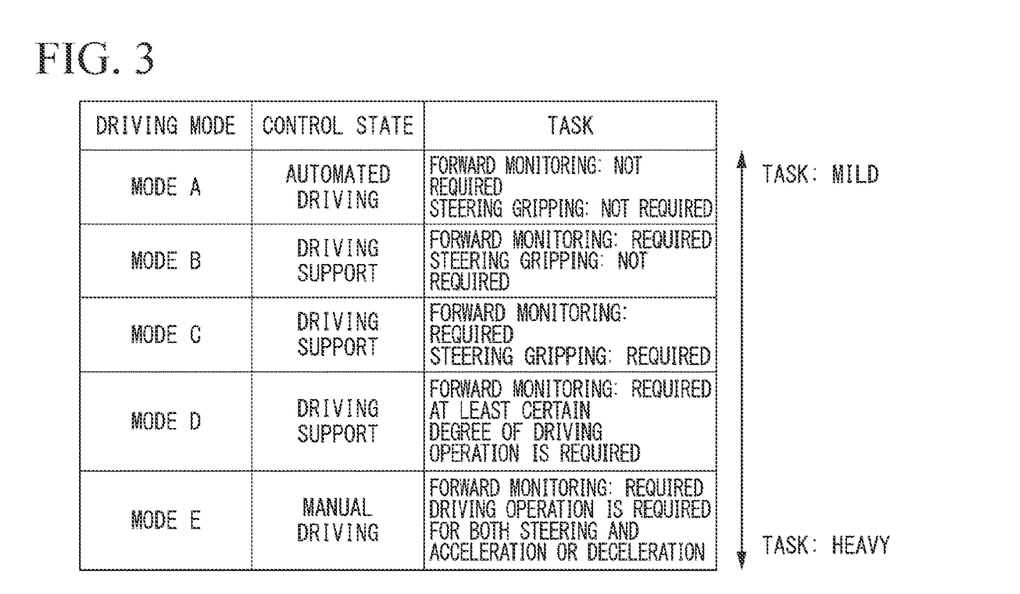
FIG. 3 is a diagram which shows an example of a correspondence relationship between a driving mode, a control state of a host vehicle, and a task.

FIG. 3 is a diagram which shows an example of a correspondence relationship between a driving mode, a control state of the host vehicle M, and a task. Driving modes of the host vehicle M include, for example, five modes from a mode A to a mode E. A degree of automation of the control state, that is, the driving control of the host vehicle M, is highest in the mode A, then decreases in the order of a mode B, a mode C, and a mode D, and is lowest in the mode E. On the other hand, the task imposed on the driver is the mildest in the mode A, then becomes heavier in the order of the mode B, the mode C, and the mode D, and is the heaviest in the mode E. Since the modes D and E are control states in which automated driving is not performed, the automated driving control device 100 is responsible for ending control related to automated driving and shifting to driving support or manual driving. Content of each driving mode will be exemplified in the following description.

In the mode A, the host vehicle M is in an automated driving state, and neither forward monitoring nor gripping of the steering wheel 82 (steering gripping in FIG. 3) is imposed on the driver. However, even in mode A, the driver is required to have a posture that enables a quick shift to manual driving in response to a request from a system centered on the automated driving control device 100. In the automated driving herein, both steering and acceleration or deceleration are controlled without depending on an operation of the driver. The front is a space in the traveling direction of the host vehicle M that is visually recognized through the front windshield. The mode A is, for example, a driving mode which can be executed when a condition such as traveling of the host vehicle M at an upper limit speed (for example, about 50 [km/h]) or less and a presence of a preceding vehicle to be followed on an automobile road such as an expressway is satisfied, and may be referred to as a traffic jam pilot (TJP) in some cases. When this condition is no longer satisfied, the mode determiner 150 changes the driving mode of the host vehicle M to the mode B.

In the mode B, the host vehicle M is in a driving support state, and a task of monitoring the front of the host vehicle M (hereinafter, forward monitoring) is imposed on the driver, but a task of gripping the steering wheel 82 is not imposed. The mode B is executed particularly when the host vehicle M is traveling at the upper limit speed or higher at which the TJP described above is executed. In the mode C, the host vehicle M is in the driving support state, and the task of forward monitoring and the task of gripping the steering wheel 82 are imposed on the driver. The mode D is a driving mode that requires a certain amount of driving operation by the driver for at least one of steering and acceleration or deceleration of the host vehicle M. For example, in the mode D, driving support such as adaptive cruise control (ACC) and lane keeping assist system (LKAS) is performed. In the mode E, the host vehicle M is in a manual driving state in which the driving operation by the driver is required for both steering and acceleration or deceleration. In both of the mode D and the mode E, a task of monitoring the front of the host vehicle M is naturally imposed on the driver.

The automated driving control device 100 (and the driving support device (not shown)) executes an automated lane change according to a driving mode. The automated lane change includes an automated lane change (1) according to a request from a system and an automated lane change (2) according to a request from a driver.

The automated lane change (1) includes an automated lane change for passing, which is performed when the speed of a preceding vehicle is lower than the speed of the host vehicle by a reference or more, and an automated lane change for traveling toward a destination (an automated lane change due to a change in a recommended lane). The automated lane change (2) involves causing the host vehicle M to change lanes in an operating direction when a direction indicator is operated by the driver and conditions related to a speed and a positional relationship with surrounding vehicles are satisfied.

The automated driving control device 100 does not execute any of the automated lane changes (1) and (2) in the mode A. The automated driving control device 100 executes both of the automated lane changes (1) and (2) in the modes B and C. The driving support device (not shown) executes the automated lane change (2) without executing the automated lane change (1) in the mode D. Neither the automated lane change (1) nor (2) is executed in the mode E.

The mode determiner 150 changes the driving mode of the host vehicle M to a driving mode in which a task is heavier when a task related to the determined driving mode (hereinafter referred to as a current driving mode) is not executed by the driver.

For example, when the driver is in a posture where he or she cannot shift to the manual driving in response to a request from the system (for example, when he or she continues to look aside outside an allowable area or when a sign of difficulty in driving is detected) in the mode A, the mode determiner 150 performs control of prompting the driver to shift to the manual driving using the HMI 30, and if the driver does not respond, bringing the host vehicle M closer to a road shoulder to be gradually stopped and stopping the automated driving. After the automated driving is stopped, the host vehicle is in a state of the mode D or E, and the host vehicle M can be started by a manual operation of the driver. The same applies to "stopping the automated driving" in the following description. When the driver is not monitoring the front in the mode B, the mode determiner 150 performs the control of prompting the driver to perform forward monitoring using the HMI 30, and if the driver does not respond, bringing the host vehicle M closer to the road shoulder to be gradually stopped and stopping the automated driving. When the driver is not monitoring the front or is not gripping the steering wheel 82 in the mode C, the mode determiner 150 performs control of prompting the driver to perform forward monitoring and/or to grip the steering wheel 82 using the HMI 30, and if the driver does not respond, bringing the host vehicle M closer to the road shoulder to be gradually stopped and stopping the automated driving.

The driver state determiner 152 monitors a state of the driver for the mode change described above, and determines whether the state of the driver is a state corresponding to a task. For example, the driver state determiner 152 performs posture estimation processing by analyzing an image captured by the driver monitor camera 70 and determines whether the driver is in a posture where he or she cannot shift to the manual driving in response to a request from the system. Moreover, the driver state determiner 152 performs line-of-sight estimation processing by analyzing the image captured by the driver monitor camera 70 and determines whether the driver is monitoring the front.

The mode change processor 154 performs various types of processing for changing a mode. For example, the mode change processor 154 instructs the action plan generator 140 to generate a target trajectory for a road shoulder stop, gives an operation instruction to a driving support device (not shown), and controls the HMI 30 to prompt the driver to take an action.

The second controller 160 controls the traveling drive force output device 200, the brake device 210, and the steering device 220 so that the host vehicle M passes through a target trajectory generated by the action plan generator 140 at a scheduled time.

Returning to FIG. 2, the second controller 160 includes, for example, an acquirer 162, a speed controller 164, and a steering controller 166. The acquirer 162 acquires information on a target trajectory (trajectory points) generated by the action plan generator 140 and stores it in a memory (not shown). The speed controller 164 controls the traveling drive force output device 200 or the brake device 210 based on a speed element associated with the target trajectory stored in the memory. The steering controller 166 controls the steering device 220 according to a degree of bending of the target trajectory stored in the memory. Processing of the speed controller 164 and the steering controller 166 is realized by, for example, a combination of feedforward control and feedback control. As an example, the steering controller 166 executes the combination of feedforward control according to a curvature of a road in front of the host vehicle M and feedback control based on a deviation from the target trajectory.

The traveling drive force output device 200 outputs a traveling drive force (torque) for the vehicle to travel to the drive wheels. The traveling drive force output device 200 includes, for example, a combination of an internal combustion engine, a motor, a transmission, and the like, and an electronic controller (ECU) that controls them. The ECU controls the configuration described above according to information input from the second controller 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor according to the information input from the second controller 160 or the information input from the driving operator 80 so that a brake torque according to a braking operation is output to each wheel. The brake device 210 may include a mechanism for transmitting a hydraulic pressure generated by an operation of a brake pedal included in the driving operator 80 to the cylinder via a master cylinder as a backup. The brake device 210 is not limited to the configuration described above, and may be an electronically controlled hydraulic brake device that controls an actuator according to the information input from the second controller 160 to transmit the hydraulic pressure of the master cylinder to the cylinder.

The steering device 220 includes, for example, a steering ECU and an electric motor. The electric motor changes, for example, a direction of a steering wheel by applying a force to a rack and pinion mechanism. The steering ECU drives the electric motor according to the information input from the second controller 160 or the information input from the driving operator 80, and changes the direction of the steering wheel.

Operation

Figure 4:
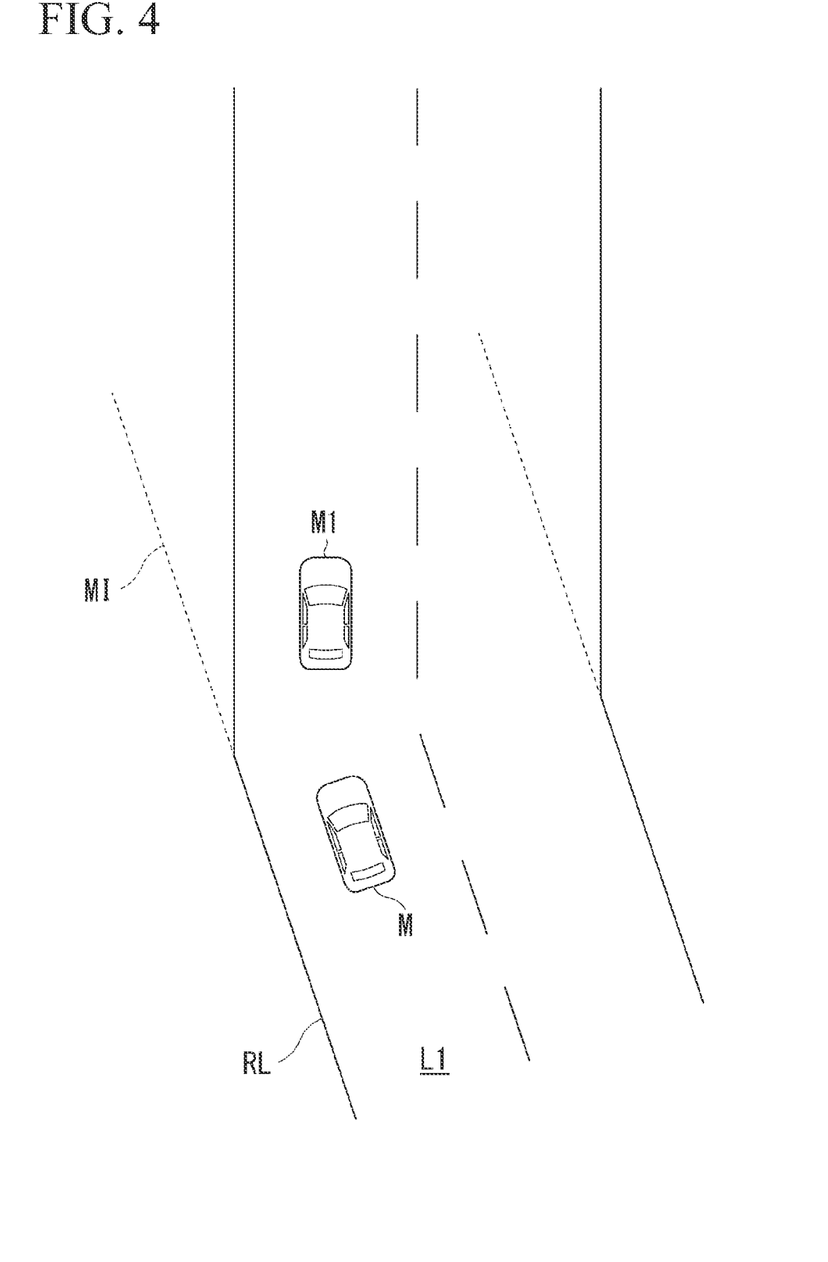
FIG. 4 is a diagram which shows an example of a situation in which an operation of the vehicle control device according to the embodiment is executed.

Next, an operation of the vehicle control device according to the embodiment will be described. FIG. 4 is a diagram which shows an example of a situation in which the operation of the vehicle control device according to the embodiment is executed. In FIG. 4, the host vehicle M is traveling in a lane L1 in the driving mode of the mode B, and a preceding vehicle M1 is traveling in front of the host vehicle M. While the host vehicle M is traveling in the lane L1, the recognizer 130 recognizes the surrounding situation of the host vehicle M, particularly the road lane markings RL on both sides of the host vehicle M. M1 indicates road lane marking information of the lane L1 stored in the second map information 62.

The determiner 132 determines whether there is an error in the second map information 62 corresponding to a surrounding situation on the basis of the surrounding situation recognized by the recognizer 130 and the second map information 62. More specifically, the determiner 132 compares the road lane marking information MI of the second map information 62 with the road lane markings RL recognized by the recognizer 130, and when the road lane marking information MI and the road lane markings RL do not match, determines whether there is an error in the second map information 62. The determiner 132 determines whether the recognizer 130 can recognize the road lane markings RL on both sides of the host vehicle M, and whether the recognized road lane markings RL on both sides are parallel (that is, an angle formed by extended lines of the road lane markings RL on both sides is equal to or less than a threshold value), and when the recognizer 130 can recognize the road lane markings RL on both sides of the host vehicle M, and the recognized road lane markings RL on both sides are parallel, it is determined that there is an error in the second map information 62. On the other hand, when the determiner 132 determines that the recognizer 130 recognizes only the road lane marking RL on one side, or when it is determined that the recognized road lane markings RL on both sides are not parallel, the mode determiner 150 determines that there is an error in the surrounding situation recognized by the recognizer 130, and changes the driving mode from the mode B to the mode C. Furthermore, when the determiner 132 determines that the recognizer 130 has not recognized the road lane markings RL on both sides, the mode determiner 150 changes the driving mode from the mode B to the mode E and causes the driver to execute the manual driving.

The determiner 132 may also determine whether there is an error in the second map information 62 further on the basis of a traveling trajectory of the preceding vehicle M1 when the road lane marking information MI and the road lane markings RL do not match. More specifically, for example, the determiner 132 may determine that there is an error in the second map information 62 when a trajectory vector of a center position of the preceding vehicle M1 is parallel to the road lane markings RL recognized by the recognizer 130.

When the determiner 132 determines that there is an error in the second map information 62 while the host vehicle M is driving in the driving mode of the mode B, the mode determiner 150 continues the driving mode of the mode B when the recognizer 130 has recognized the preceding vehicle M1 within a first predetermined distance D1 (for example, several meters to several tens of meters) on the side of the host vehicle M in the traveling direction. When the driving mode of the mode B is continued, the action plan generator 140 generates a target trajectory that causes the host vehicle M to follow the preceding vehicle M1 on the basis of the traveling trajectory of the preceding vehicle M1. In other words, before it is determined that there is an error in the second map information 62, the driving mode of the mode B is executed on the basis of the second map information 62 and the surrounding situation recognized by the recognizer 130, but after it is determined that there is an error in the second map information 62, the driving mode of the mode B is continued on the basis of the traveling trajectory of the preceding vehicle M1 and the surrounding situation recognized by the recognizer 130. As a result, it is possible to improve continuity of the driving mode of the mode B.

In the description above, a case where the driving mode of the mode B is continued even when the determiner 132 determines that there is an error in the second map information 62 has been described, but, when a deviation between the road lane markings RL recognized by the recognizer 130 and the second map information 62 is equal to or greater than a threshold value, the mode determiner 150 may change the driving mode to the mode C without continuing the driving mode of the mode B. More specifically, for example, the determiner 132 may determine the deviation on the basis of whether an angle formed by the extended lines of the road lane markings RL recognized by the recognizer 130 and an extended line of a corresponding road lane marking in the second map information 62 is equal to or greater than a threshold value.

Furthermore, in FIG. 4, a case in which the preceding vehicle M1 is traveling on a host lane L1 has been described, but the mode determiner 150 continues the driving mode of the mode B in the same manner when the recognizer 130 recognizes the preceding vehicle M1 traveling in an adjacent lane of the host lane L1.

When the determiner 132 determines that there is an error in the second map information 62 while the host vehicle M is driving in the driving mode of the mode B, the mode determiner 150 changes the driving mode of the mode B to the mode C when the recognizer 130 does not recognize the preceding vehicle M1 within the first predetermined distance D1 on the traveling direction side of the host vehicle M. This is because information that can be utilized in continuing a driving support is only the surrounding situation recognized by the recognizer 130. On the other hand, at this stage, since it is determined that there is an error in the second map information 62, in other words, the surrounding situation recognized by the recognizer 130 is correct, the mode determiner 150 may continue the driving mode of the mode B for a certain period of time, and then change it to the mode C. As a result, it is possible to reduce a feeling of discomfort that the occupant may have due to a change in the driving mode.

When the action plan generator 140 generates a target trajectory such that the host vehicle M is caused to follow the preceding vehicle M1 on the basis of the traveling trajectory of the preceding vehicle M1, the action plan generator 140 sets an inter-vehicle time between the host vehicle M and the preceding vehicle M1 to a first predetermined time T1 (for example, several seconds) that enables the recognizer 130 to recognize both the road lane markings RL and the traveling trajectory of the preceding vehicle M1. Here, the inter-vehicle time means a time required for the host vehicle M to reach a current position of the preceding vehicle M1 from a current position thereof when it is assumed that the host vehicle M travels at a current speed.

Figure 5:
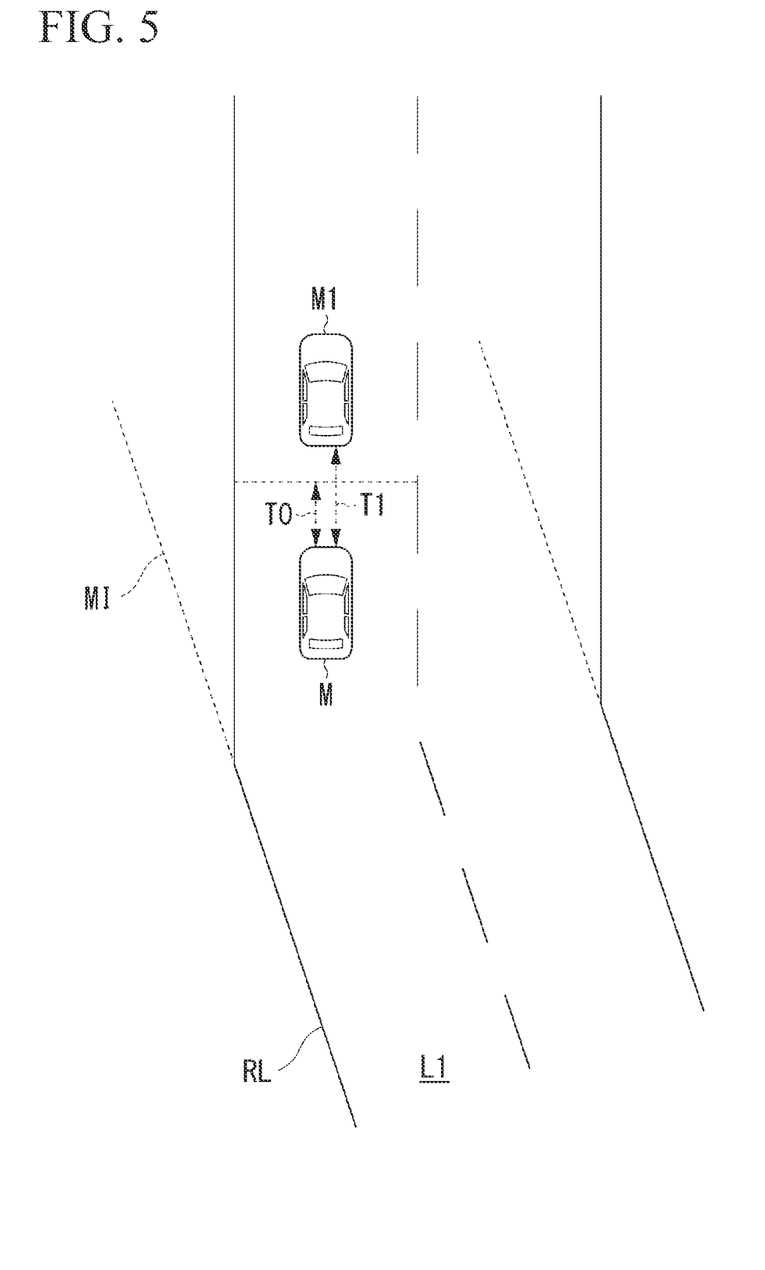
FIG. 5 is a diagram which shows an example of a situation in which a host vehicle follows a preceding vehicle when it is determined that there is an error in second map information.

FIG. 5 is a diagram which shows an example of a situation in which the host vehicle M follows the preceding vehicle M1 when it is determined that there is an error in the second map information 62. In FIG. 5, T0 indicates a minimum inter-vehicle time that enables the recognizer 130 to recognize the road lane markings RL on both sides of the host vehicle M with a small error. In other words, when the inter-vehicle time between the host vehicle M and the preceding vehicle M1 is smaller than the minimum time T0, the presence of the preceding vehicle M1 becomes an obstacle in a view field of the camera 10, and an accuracy in recognition of the road lane markings RL by the camera 10 is reduced. For this reason, as shown in FIG. 5, the action plan generator 140 sets the inter-vehicle time between the host vehicle M and the preceding vehicle M1 to the first predetermined time T1 which is longer than the minimum time T0 and enables the recognizer 130 to recognize both the road lane markings RL and the traveling trajectory of the preceding vehicle M1, and generates a target trajectory so that the host vehicle M follows the preceding vehicle M1. As a result, even when it is determined that there is an error in the second map information 62, it is possible to cause the host vehicle M to follow the preceding vehicle M1 while maintaining an inter-vehicle time suitable for driving support, and to continue the driving mode of the mode B.

However, on the other hand, when the host vehicle M follows the preceding vehicle M1, the preceding vehicle M1 may rapidly accelerate and the inter-vehicle distance between the host vehicle M and the preceding vehicle M1 may increase. In this case, the recognizer 130 may not be able to accurately recognize the traveling trajectory of the preceding vehicle M1. When the traveling trajectory of the preceding vehicle M1 cannot be accurately recognized, the recognizer 130 can obtain only information on surroundings of the host vehicle M and cannot continue the driving mode of the mode B. For this reason, the mode determiner 150 changes the driving mode of the mode B to the mode C when the inter-vehicle time between the host vehicle M and the preceding vehicle M1 is equal to or longer than a second predetermined time T2 (for example, several seconds), which is longer than the first predetermined time T1.

Figure 6:
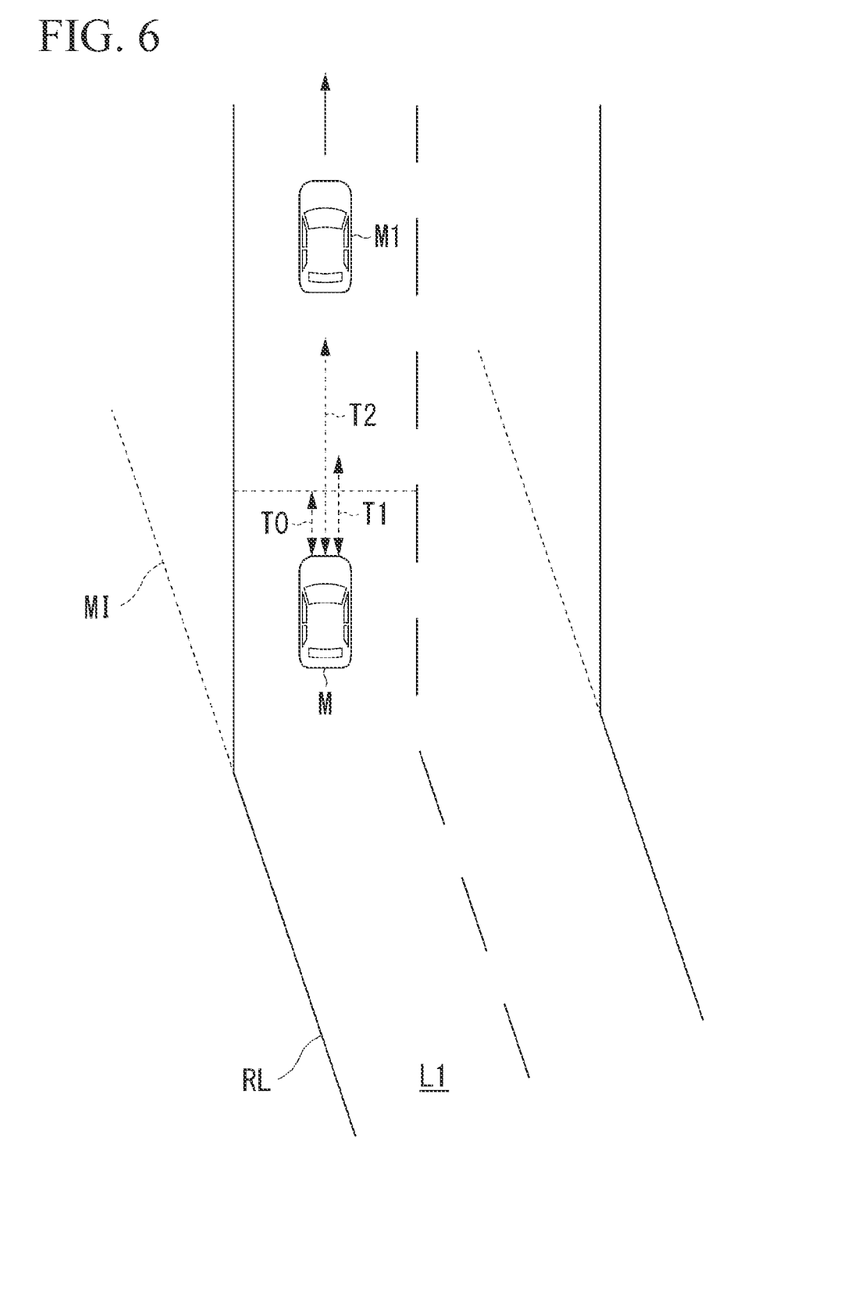
FIG. 6 is a diagram which shows another example of the situation in which a host vehicle follows a preceding vehicle when it is determined that there is an error in second map information.

FIG. 6 is a diagram which shows another example of the situation in which the host vehicle M follows the preceding vehicle M1 when it is determined that there is an error in the second map information 62. In FIG. 6, it is assumed that the host vehicle M initially follows the preceding vehicle M1 in the driving mode of the mode B, but as a result of the rapid acceleration of the preceding vehicle M1, the inter-vehicle time between the host vehicle M and the preceding vehicle M1 is equal to or longer than the second predetermined time T2. In this case, the mode determiner 150 changes the driving mode of the mode B to the mode C. At this stage, since it is determined that there is an error in the second map information 62, in other words, since it is determined that the surrounding situation recognized by the recognizer 130 is correct, the mode determiner 150 may continue the driving mode of the mode B for a certain period of time, and then change it to the mode C.

Figure 7:
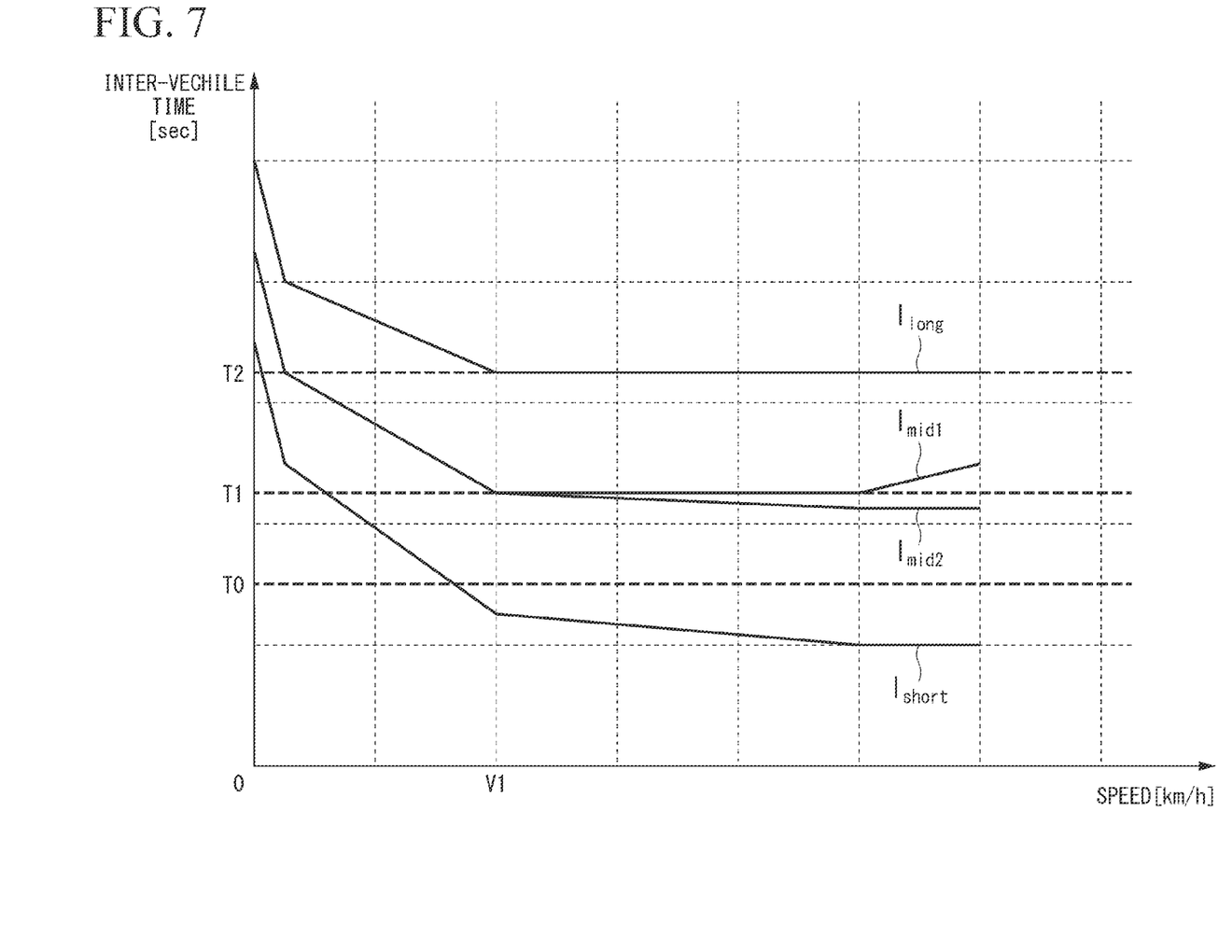
FIG. 7 is a graph for describing a relationship between an inter-vehicle time between a host vehicle and a preceding vehicle and a speed of the host vehicle.

Next, a relationship between the inter-vehicle time set when the driving mode of the mode B is continued and the speed of the host vehicle M will be described with reference to FIG. 7. FIG. 7 is a graph for describing the relationship between the inter-vehicle time between the host vehicle M and the preceding vehicle M1 and the speed of the host vehicle M. In FIG. 7, llong indicates a maximum inter-vehicle time set when the host vehicle M follows the preceding vehicle M1, and lshort is a minimum inter-vehicle time set when the host vehicle M follows the preceding vehicle M1.

Furthermore, lmid1 indicates an intermediate inter-vehicle time set when the host vehicle M follows the preceding vehicle M1 in the driving mode of the mode B and the occupant of the host vehicle M is not gripping the steering wheel 82, and lmid2 indicates an intermediate inter-vehicle time set when the host vehicle M follows the preceding vehicle M1 in the driving mode of the mode B and the occupant of the host vehicle M is gripping the steering wheel 82. The inter-vehicle time indicated by llong has a high accuracy in the recognition of the road lane markings RL by the recognizer 130, but a low accuracy in the recognition of the traveling trajectory of the preceding vehicle M1, and the inter-vehicle time indicated by lshort has a low accuracy in the recognition of the road lane markings RL by the recognizer 130, but a high accuracy in the recognition of the traveling trajectory of the preceding vehicle M1. The inter-vehicle times indicated by lmid1 and lmid2 are values which enable the recognizer 130 to suitably recognize both the road lane markings RL and the traveling trajectory of the preceding vehicle M1. V1 indicates the upper limit speed at which TJP is executed. Referring to FIG. 7, in a range of the speed V1 or higher, the inter-vehicle time indicated by lmid2 is set to be shorter than the inter-vehicle time indicated by lmid1. This is because the occupant of the host vehicle M can shift to the manual driving more quickly when the occupant of the host vehicle M is gripping the steering wheel 82, and a smaller inter-vehicle distance is allowed.

As described above, since the driving mode of the mode B is executed when the speed of the host vehicle M is equal to or higher than V1, the value of the inter-vehicle time indicated by lmid1 can be regarded to be substantially constant. This value corresponds to the first predetermined time T1. Furthermore, as shown in FIG. 7, in a region having the speed of V1 or higher, the value of the inter-vehicle time indicated by lmid2 can also be considered to be substantially constant. For this reason, the action plan generator 140 may change the first predetermined time T1 set as the inter-vehicle time to a smaller value when the host vehicle M follows the preceding vehicle M1 while the speed is equal to or higher than V1 and the occupant of the host vehicle M is gripping the steering wheel 82. That is, the action plan generator 140 may change the first predetermined time T1 depending on whether the occupant of the host vehicle M is gripping the steering wheel 82.

In the description above, when the host vehicle M is caused to follow the preceding vehicle M1, the action plan generator 140 sets the inter-vehicle distance between the host vehicle M and the preceding vehicle M1 using the inter-vehicle time.

However, instead, the action plan generator 140 may also set the inter-vehicle distance to a second predetermined distance (for example, several meters to several tens of meters) that enables the recognizer 130 to recognize both of the road lane markings RL and the traveling trajectory of the preceding vehicle M1. In this case, the action plan generator 140 may change the second predetermined distance depending on whether the occupant of the host vehicle M is gripping the steering wheel 82, as in the configuration using the inter-vehicle time.

Operation Flow

Figure 8:
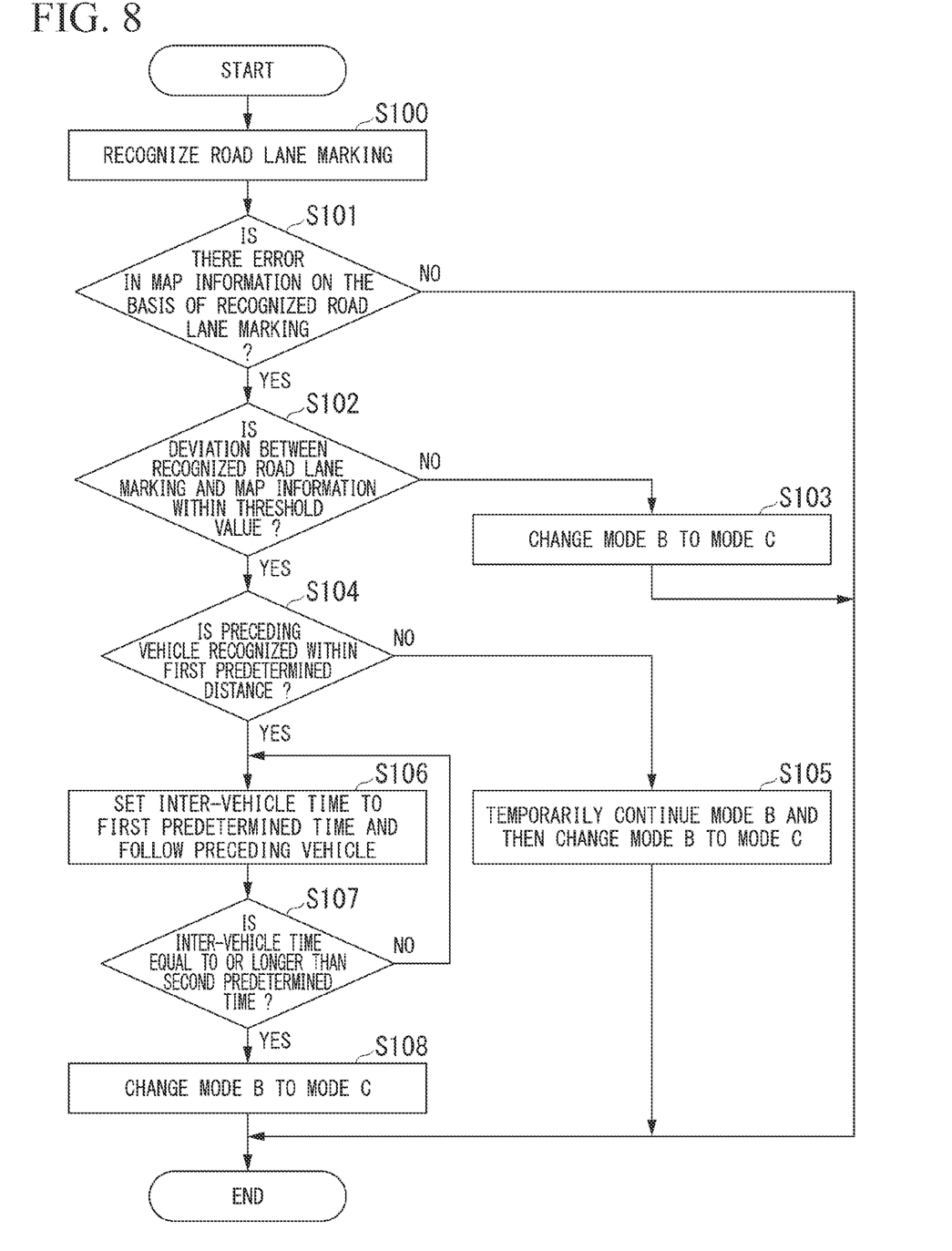
FIG. 8 is a flowchart which shows an example of a flow of an operation executed by the vehicle control device according to the embodiment.

Next, with reference to FIG. 8, a flow of an operation executed by the vehicle control device will be described. FIG. 8 is a flowchart which shows an example of the flow of an operation executed by the vehicle control device according to the embodiment. Processing of this flowchart is executed in a predetermined control cycle while the host vehicle M is traveling in a driving mode of the mode B.

First, the recognizer 130 recognizes road lane markings RL on both sides of the host vehicle M (step S100). Next, the determiner 132 compares the recognized road lane markings RL with the road lane marking information of the second map information 62, and determines whether there is an error in the second map information 62 (step S101). When it is determined that there is no error in the second map information 62, the host vehicle M continues to travel in the driving mode of the mode B, and the processing of this flowchart ends. On the other hand, when it is determined that there is an error in the second map information 62, the determiner 132 determines whether the deviation between the recognized road lane markings RL and the second map information 62 is within a threshold value (step S102). When it is determined that the deviation is not within the threshold value, the mode determiner 150 changes the driving mode from the mode B to the mode C (step S103).

On the other hand, when it is determined that the deviation is within the threshold value, the recognizer 130 determines whether the preceding vehicle M1 is recognized within the first predetermined distance D1 (step S104). When it is determined that the preceding vehicle M1 is not recognized within the first predetermined distance D1, the mode determiner 150 temporarily continues the driving mode of the mode B and then changes it to the mode C (step S105). On the other hand, when it is determined that the preceding vehicle M1 is recognized within the first predetermined distance D1, the action plan generator 140 sets the inter-vehicle time between the host vehicle M and the preceding vehicle M1 to the first predetermined time T1, and generates a target trajectory such that the host vehicle M follows the preceding vehicle M1, and the second controller 160 causes the host vehicle M to travel the target trajectory (step S106). Next, the mode determiner 150 determines whether the inter-vehicle time is equal to or longer than the second predetermined time T2 (step S107). When it is not determined that the inter-vehicle time is equal to or longer than the second predetermined time T2, the action plan generator 140 returns the processing to step S106. On the other hand, when it is determined that the inter-vehicle time is equal to or longer than the second predetermined time T2, the mode determiner 150 changes the driving mode from the mode B to the mode C (step S108). As a result, processing of this flowchart ends.

According to the present embodiment described above, when it is determined that there is an error in map information on the basis of recognized road lane markings and a preceding vehicle is present within a range of a predetermined distance from the host vehicle, it is possible to cause the host vehicle to follow the preceding vehicle with an inter-vehicle distance maintained such that road lane markings and a traveling trajectory of the preceding vehicle can be correctly recognized, and to continue a driving support. As a result, even when the map information mounted in a vehicle and the recognized external world information are different from each other, it is possible to flexibly change the driving control.

The embodiment described above can be expressed as follows.

A vehicle control device is configured to include a storage device that stores a program and a hardware processor, in which the hardware processor executes the program stored in the storage device, thereby recognizing a surrounding situation of a vehicle; controlling steering and acceleration or deceleration of the vehicle without depending on an operation of a driver of the vehicle on the basis of the surrounding situation and map information; determining a driving mode of the vehicle to be one of a plurality of driving modes including a first driving mode and a second driving mode, and changing the driving mode of the vehicle to a driving mode in which a task is heavier when a task related to the determined driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of the driver of the vehicle; determining whether there is an error in the map information on the basis of the surrounding situation and the map information; and in a case where it is determined that there is an error in the map information while the vehicle is driving in the second driving mode, continuing the second driving mode when a preceding vehicle is recognized within a first predetermined distance on a traveling direction side of the vehicle, or changing the second driving mode to the first driving mode when a preceding vehicle is not recognized within the first predetermined distance on the traveling direction side of the vehicle.

Although a mode for carrying out the present invention has been described above using the embodiment, the present invention is not limited to the embodiment, and various modifications and substitutions can be made within a range not departing from the gist of the present invention.

What is claimed is:

1. A vehicle control device comprising:
a storage device which stores a program, and
a hardware processor,
wherein the hardware processor executes the program stored in the storage device, thereby:
recognizing a surrounding situation of a vehicle;
controlling steering and acceleration or deceleration of the vehicle without depending on an operation of a driver of the vehicle on the basis of the surrounding situation and map information;
determining a driving mode of the vehicle to be one of a plurality of driving modes including a first driving mode and a second driving mode, and changing the driving mode of the vehicle to a driving mode in which a task is heavier when a task related to the determined driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of the driver of the vehicle;
determining whether there is an error in the map information on the basis of the surrounding situation and the map information; and
in a case where it is determined that there is an error in the map information while the vehicle is driving in the second driving mode, continuing the second driving mode when a preceding vehicle is recognized within a first predetermined distance on a traveling direction side of the vehicle, or changing the second driving mode to the first driving mode when a preceding vehicle is not recognized within the first predetermined distance on the traveling direction side of the vehicle.

2. The vehicle control device according to claim 1,
wherein the hardware processor compares road lane marking information of the map information with a recognized road lane marking, and when the road lane marking information does not match the road lane marking, determines whether there is an error in the map information on the basis of whether road lane markings on both sides of the vehicle are recognizable and a degree of parallelization of the road lane markings on both sides.

3. The vehicle control device according to claim 2,
wherein the hardware processor determines whether there is an error in the map information further on the basis of a traveling trajectory of the preceding vehicle when the road lane marking information of the map information does not match the recognized road lane marking.

4. The vehicle control device according to claim 1,
wherein the hardware processor causes the vehicle to follow the preceding vehicle on the basis of a traveling trajectory of the preceding vehicle when the second driving mode is continued.

5. The vehicle control device according to claim 4,
wherein the hardware processor sets an inter-vehicle time between the vehicle and the preceding vehicle to a first predetermined time when the vehicle is caused to follow the preceding vehicle, and
wherein the first predetermined time is a time during which both a road lane marking and a traveling trajectory of the preceding vehicle are recognizable.

6. The vehicle control device according to claim 5, further comprising a grip sensor configured to detect whether a driver of the vehicle is gripping an operator that receives a steering operation of the vehicle,
wherein the hardware processor changes the first predetermined time to a smaller value when the grip sensor has detected that the driver is gripping the steering wheel.

7. The vehicle control device according to claim 5,
wherein the hardware processor changes the second driving mode to the first driving mode when an inter-vehicle time between the vehicle and the preceding vehicle is equal to or longer than a second predetermined time which is longer than the first predetermined time.

8. The vehicle control device according to claim 4,
wherein the hardware processor sets an inter-vehicle distance between the vehicle and the preceding vehicle to a second predetermined distance when the vehicle follows the preceding vehicle, and
wherein the second predetermined distance is a distance at which both a road lane marking and a traveling trajectory of the preceding vehicle are recognizable.

9. The vehicle control device according to claim 8, further comprising a grip sensor configured to detect whether a driver of the vehicle is gripping an operator that receives a steering operation of the vehicle,
wherein the hardware processor changes the second predetermined distance to a smaller value when the grip sensor has detected that the driver is gripping the steering wheel.

10. The vehicle control device according to claim 1,
wherein the hardware processor changes the second driving mode to the first driving mode after continuing the second driving mode for a certain period when the hardware processor does not recognize a preceding vehicle within the first predetermined distance with respect to a front of the vehicle in a traveling direction.

11. The vehicle control device according to claim 1,
wherein the hardware processor changes the second driving mode to the first driving mode when only one side of a road lane marking is recognized.

12. The vehicle control device according to claim 1,
wherein the hardware processor changes the second driving mode to the first driving mode when a deviation between a recognized road lane marking and the map information is equal to or greater than a threshold value.

13. The vehicle control device according to claim 1,
wherein the second driving mode is a driving mode in which a task of gripping an operator that receives a steering operation of the vehicle is not imposed on the driver, and
wherein the first driving mode is a driving mode in which at least a task of gripping the operator that receives a steering operation of the driver is imposed on the driver.

14. A vehicle control method to be executed by a computer, comprising:
recognizing a surrounding situation of a vehicle;
controlling steering and acceleration or deceleration of the vehicle without depending on an operation of a driver of the vehicle on the basis of the surrounding situation and map information;
determining a driving mode of the vehicle to be one of a plurality of driving modes including a first driving mode and a second driving mode, and changing the driving mode of the vehicle to a driving mode in which a task is heavier when a task related to the determined driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of the driver of the vehicle;
determining whether there is an error in the map information on the basis of the surrounding situation and the map information; and
when it is determined that there is an error in the map information while the vehicle is driving in the second driving mode, continuing the second driving mode when a preceding vehicle is recognized within a first predetermined distance on a traveling direction side of the vehicle, or changing the second driving mode to the first driving mode when a preceding vehicle is not recognized within the first predetermined distance on the traveling direction side of the vehicle.

15. A computer-readable non-transitory storage medium that stores a program causing a computer to execute:
recognizing a surrounding situation of a vehicle;
controlling steering and acceleration or deceleration of the vehicle without depending on an operation of a driver of the vehicle on the basis of the surrounding situation and map information;
determining a driving mode of the vehicle to be one of a plurality of driving modes including a first driving mode and a second driving mode, and changing the driving mode of the vehicle to a driving mode in which a task is heavier when a task related to the determined driving mode is not executed by the driver, the second driving mode being a driving mode in which a task imposed on the driver is lighter than in the first driving mode, some of the plurality of driving modes including at least the second driving mode being performed by controlling steering and acceleration or deceleration of the vehicle without depending on an operation of the driver of the vehicle;
determining whether there is an error in the map information on the basis of the surrounding situation and the map information; and
when it is determined that there is an error in the map information while the vehicle is driving in the second driving mode, continuing the second driving mode when a preceding vehicle is recognized within a first predetermined distance on a traveling direction side of the vehicle, or changing the second driving mode to the first driving mode when a preceding vehicle is not recognized within the first predetermined distance on the traveling direction side of the vehicle.

* * * * *